Jan. 2, 1934.       H. BOGAERTS       1,941,736
PROCESS OF PRODUCING PLASTIC PICTURES FROM METAL FOIL
Filed March 14, 1933
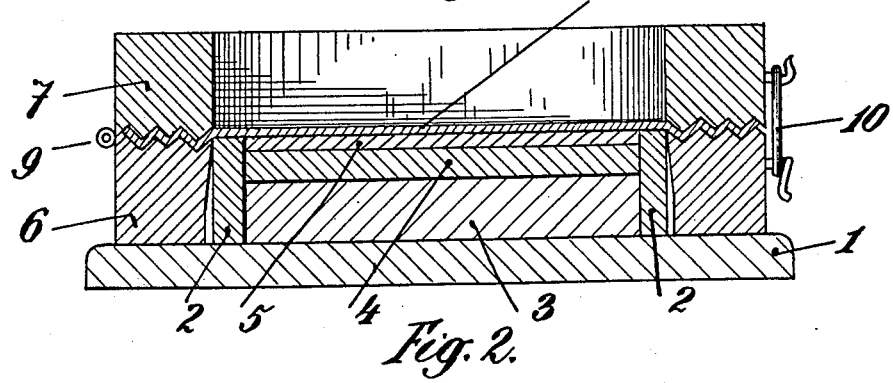
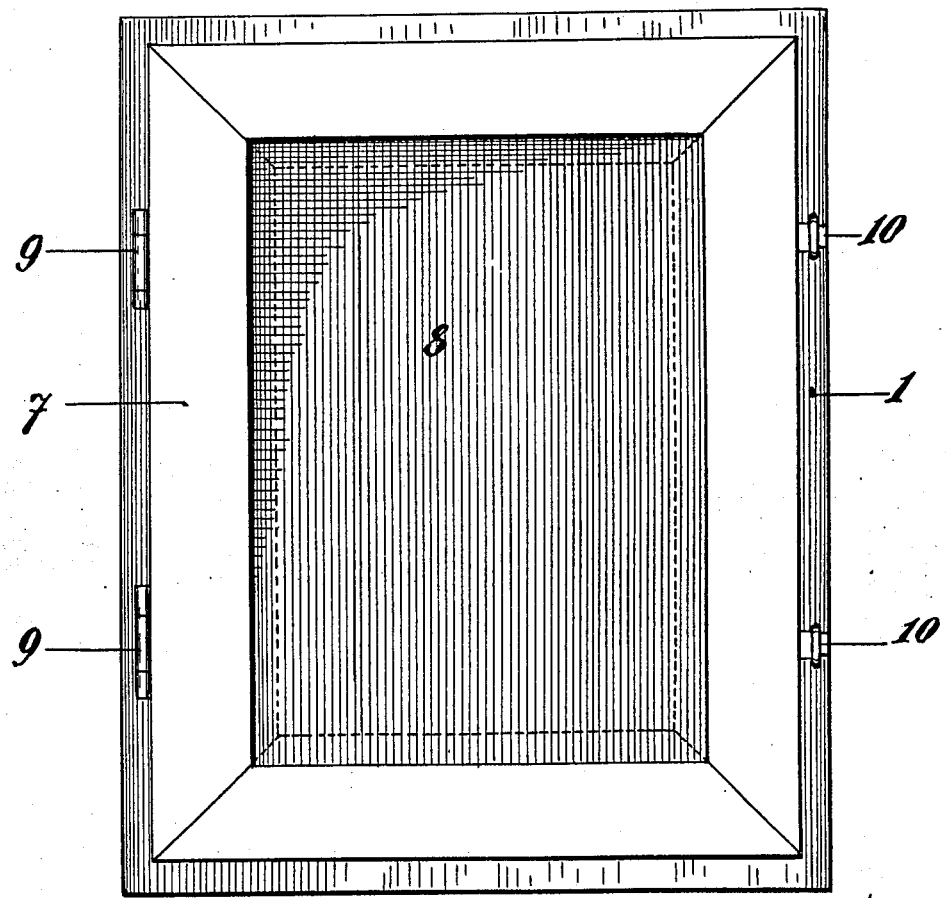

Patented Jan. 2, 1934

1,941,736

UNITED STATES PATENT OFFICE 1,941,736

PROCESS OF PRODUCING PLASTIC PICTURES FROM METAL FOIL

Hubert Bogaerts, Berlin-Halensee, Germany, assignor to Metallrelief G. m. b. H., Berlin, Germany, a corporation of Germany Application March 14, 1933, Serial No. 660,747, and in Germany March 30, 1932

2 Claims. (Cl. 41—24)

The invention relates to a process of producing plastic pictures from metal foil.

It is already known to produce plastic pictures, for instance plastic photographs, by applying a picture which has been obtained by photography or printing, on the front side of a carrier made from paper or metal and thereupon transforming it into a relief by an embossing operation or by applying pressure on the rear side of the carrier. With such a carrier made from paper, however, not only the impression recedes very easily and the pressing operation by means of an embossing implement is very troublesome and subsequent corrections are difficult, but also the transformation of the plain picture to the relief is very difficult because of the fact that no clue is afforded on the rear side of the carrier for the details of the relief and, therefore, one is obliged to work blindly, whereby faults arise very easily.

When a metal foil is used as picture carrier, dressing is easier, true, and corrections can be made much more conveniently since the foil is made from soft metal and thus gives way in any direction, but the main difficulty, viz. the impression of the relief from the rear side exists also in this case, and no clue is afforded on the rear side of the carrier for this operation.

The present invention has for its object to overcome these drawbacks which object is achieved by applying the picture to the foil made from soft metal at least on the rear side or both on the rear and front side of the foil. If the picture is applied to both sides of the foil, these two pictures must of course cover one another, and the rear picture therefore must be laterally inverse. Under circumstances the rear side picture may be applied as negative. The raised places of the picture thus are then pressed out by the aid of the picture applied to the rear side, so that every detail can exactly be treated and even the hair of a portrait can sharply be embossed from the rear side, while the indentations of the relief can be dressed from the front side.

According to the invention the metal foil with the picture or pictures applied thereto is clamped in known manner into a two-part frame, so that the relief is protected against damage and the treatment is made more convenient.

Any suitable filling mass, such as gypsum or the like, is then poured as usual on to the rear side of the relief picture produced in this manner, and a solid rear wall is thereupon applied to the gypsum mass. The edges of the foil may be bent over the filling mass, and a metal plate or the like may be embedded in the filling mass, in order to strengthen the whole and to prevent breakage. In order to prevent, further, loosening of the foil from the filling mass, the former advantageously is covered with a suitable lacquer, such as for example bakelite lacquer which is strewed with graphite dust when still in halfdry state.

The foil is made best from a pure, soft metal, such as lead, tin or aluminum, and a thin coating of copper, steel, brass or the like may be applied to the front side, so that the picture assumes the tone of color of this coating. In order to cause the picture print to firmly adhere to the metal foil, the latter to advantage is covered previously with a suitable lacquer, such as nitro- or bakelite-lacquer.

If in the production of these plastic pictures a photograph is used for the front side, a particularly good effect is obtained by bringing the color of the carbon print or the like into accord with the metal foil. So it is recommendable to provide a blue print for a copper foil, a green print for a brass foil, and a bluish green print for a steel foil. Metal foil covered with a sensitive emulsion is less adapted, as in pictures of the present kind the tone of the color of the carbon print or the like is of chief importance as to the effect of the relief. It is of advantage, further, to moisten the photographic print on the front side with a solution of rice starch or sugar water, in order to make it elastic and thus to prevent scaling during the embossing and dressing operations.

Suitable filling masses are obtained by mixing metal particles with cement, marble cement or the like.

In order that the process may be clearly understood, it is described hereinafter with reference to the accompanying drawing which represents by way of example a frame suitable for the production of reliefs in accordance with the present process, and in which Figure 1 is a vertical cross section of the frame, while Figure 2 is a top view thereof.

The frame illustrated is a folding frame the upper and lower portions 6 and 7 of which are interconnected by hinges 9 and can be firmly pressed to one another by means of a lock 10. The frame is first put in open state on to a wooden plate 1 and the under half 6 is then filled with felt pieces 2, 3 onto which layers of clean blotting paper 4, 5 are applied. Thereupon the foil 8 which already carries the picture to be embossed, is put thereon with the rear side above and the frame is closed so that the foil 8 is held immovably fixed therein. The embossing work can now be carried out from this rear side from above by embossing the foil by means of suitable tools toward the layers of blotting paper and felt thereunder.

When the progress of the work is to be controlled, the whole frame is turned and the soft layers are removed temporarily, so that the front side of the later relief becomes visible.

After termination of the embossing work, the filling mass is applied to the rear side of the foil 8 without the latter being removed from the frame. To this end simply the filling mass is poured into the free space enclosed in the upper frame half 7.

When corrections of the relief are to be made from the front side, the soft layers 2, 3 and 4, 5 may be withdrawn from the lower frame half 6 and put into the upper half 7, so that the front side of the relief becomes free and the necessary corrections can be made from this side.

By applying the filling mass to the rear side of the relief, previous to its being withdrawn from the frame, it is prevented that the comparatively soft and sensitive foil material is deformed, whereby of course the relief would be damaged.

I claim:

1. The process of producing relief pictures on metal foils, consisting in applying a picture both to the front and rear side of the foil and embossing the foil from the rear side according to the picture thereon, while correcting it from the front side according to the picture applied to this side.

2. In the process as specified in claim 1 moistening the picture applied to the front side of the foil previous to the beginning of the embossing work with a liquid adapted to make the picture material elastic, such as a solution of rice-starch or sugar water.

HUBERT BOGAERTS.